United States Patent
Wu et al.

(10) Patent No.: US 7,953,036 B2
(45) Date of Patent: May 31, 2011

(54) SYSTEM FOR REGISTRATION OF COMMUNICATION DEVICES

(75) Inventors: Xidong Wu, Livermore, CA (US); Donggen Zhang, Fremont, CA (US); Haibo Zhang, San Jose, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 976 days.

(21) Appl. No.: 11/829,383

(22) Filed: Jul. 27, 2007

(65) Prior Publication Data

US 2009/0029700 A1 Jan. 29, 2009

(51) Int. Cl.
*H04W 4/00* (2009.01)
*H04W 8/02* (2009.01)
(52) U.S. Cl. ............... 370/328; 370/338; 455/435.1
(58) Field of Classification Search .............. None
See application file for complete search history.

(56) References Cited

U.S. PATENT DOCUMENTS

| | | | |
|---|---|---|---|
| 7,502,615 B2 * | 3/2009 | Wilhoite et al. | 455/442 |
| 7,664,497 B2 * | 2/2010 | Willey et al. | 455/435.1 |
| 2003/0186681 A1 * | 10/2003 | Gabor | 455/411 |
| 2005/0136925 A1 * | 6/2005 | Yamauchi | 455/435.1 |
| 2005/0136926 A1 * | 6/2005 | Tammi et al. | 455/435.1 |
| 2006/0143696 A1 | 6/2006 | Faccin et al. | |
| 2006/0286982 A1 * | 12/2006 | Prakash et al. | 455/435.1 |
| 2007/0032234 A1 * | 2/2007 | Jain et al. | 455/435.1 |
| 2007/0091898 A1 | 4/2007 | Rengaraju et al. | |
| 2007/0127447 A1 | 6/2007 | Cho | |
| 2007/0127452 A1 | 6/2007 | Croy | |
| 2008/0108348 A1 * | 5/2008 | Kottilingal et al. | 455/435.1 |

\* cited by examiner

*Primary Examiner* — Pankaj Kumar
*Assistant Examiner* — Marcus R Smith
(74) *Attorney, Agent, or Firm* — Guntin Meles & Gust, PLC; Pablo Meles

(57) ABSTRACT

A system that incorporates teachings of the present disclosure may include, for example, a mobile Voice over IP (VoIP) communication device (MVCD) having a controller element to register with a VoIP call processing system by way of a Wireless Fidelity (WiFi) access point operating in a cluster of WiFi access points each having cell coverage area, and re-register with the VoIP call processing system by way of the WiFi access point in response to receiving a re-registration request upon expiration of a timer having a period determined from one or more behavioral attributes of the MVCD. Additional embodiments are disclosed.

20 Claims, 4 Drawing Sheets

101

SYSTEM FOR REGISTRATION OF COMMUNICATION DEVICES

FIELD OF THE DISCLOSURE

The present disclosure relates generally to communication systems, and more specifically to a system for registration of communication devices.

BACKGROUND

It is presently common for multimode communication devices to roam between networks using a number of access technologies such as Wireless Fidelity (WiFi) and cellular. When connected to a WiFi access point, a Voice over IP (VoIP) call processing system can lose track of a communication device when it roams between WiFi access points. This can happen when the call processing system takes too long to send the communication device a request to re-register with the network. Under such circumstances, a call process system can expend unnecessary resources trying to locate the communication device to complete a call directed to it.

DETAILED DESCRIPTION OF THE DRAWINGS

In one embodiment of the present disclosure, a computer-readable storage medium can have computer instructions for detecting registration of a mobile Voice over Internet Protocol (VoIP) communication device (MVCD) by way of a Wireless Fidelity (WiFi) access point operating in a cluster of WiFi access points each having cell coverage area, enabling a timer having a period determined from one or more behavioral attributes of the MVCD, and submitting by way of the WiFi access point a re-registration request to the MVCD responsive to an expiration of the timer.

In one embodiment of the present disclosure, an MVCD can have a controller element to register with a VoIP call processing system by way of a WiFi access point operating in a cluster of WiFi access points each having cell coverage area, and re-register with the VoIP call processing system by way of the WiFi access point in response to receiving a re-registration request upon expiration of a timer having a period determined from one or more behavioral attributes of the MVCD.

In one embodiment of the present disclosure, a WiFi access point can have a controller element to receive from an MVCD a first wireless message including a registration request directed to a VoIP call processing system, transmit the registration request to the VoIP call processing system, receive from the VoIP call processing system a re-registration request directed to the MVCD upon expiration of a timer having a period determined from one or more behavioral attributes of the MVCD, and transmit to the MVCD a second wireless message with the re-registration request.

Figure 1:
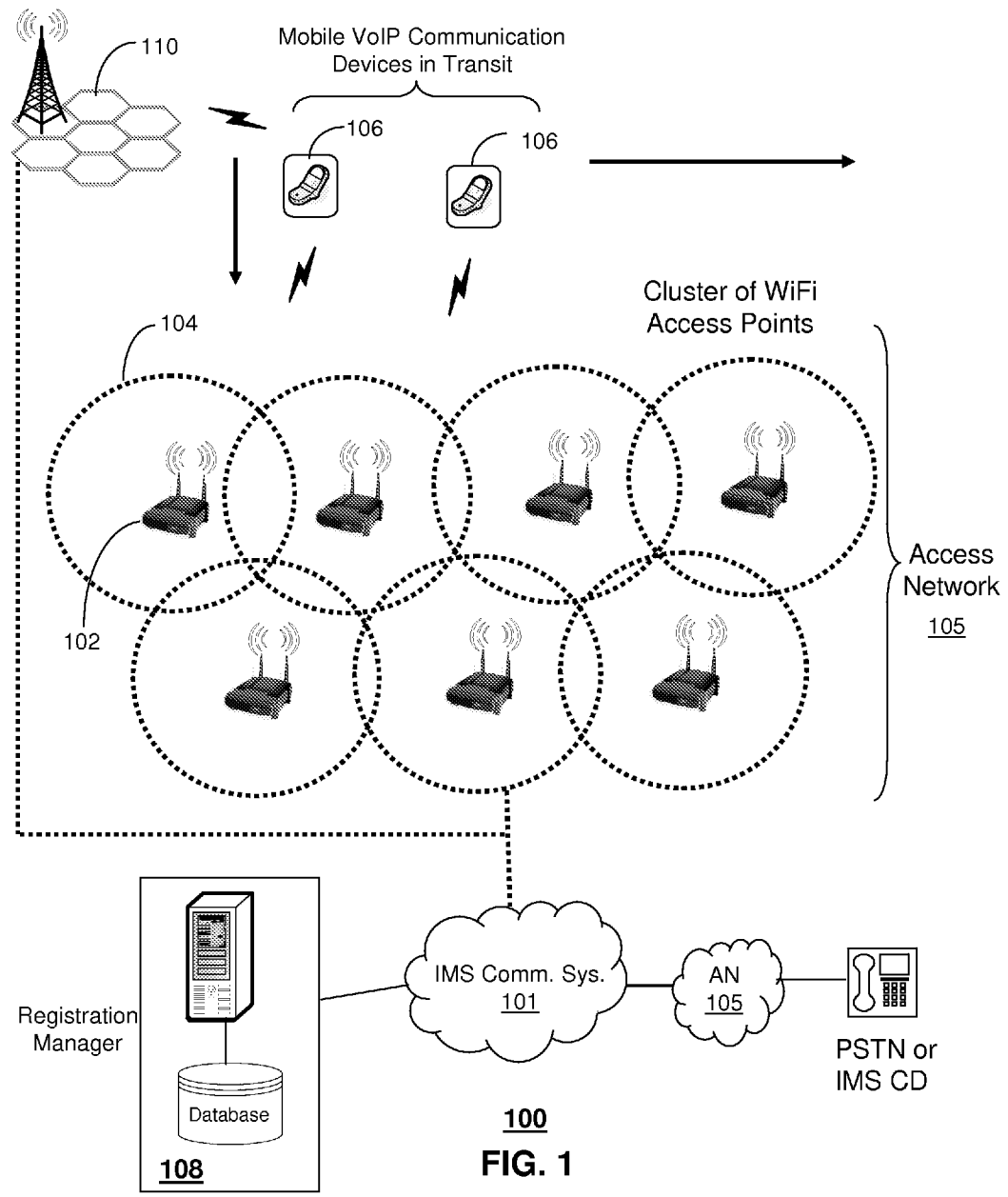
FIG. 1 depicts an block diagram of a communication system.

FIG. 1 depicts an exemplary block diagram of a communication system 100. The communication system 100 comprises a short-range wireless access network 105 comprising a cluster of WiFi access points 102 positioned with overlapping wireless coverage cells 104. Mobile Voice over IP (VoIP) communication devices (MVCDs) 106 can roam between the access network 105 and a cellular network 110 depending on the location of the MVCDs.

Figure 2:
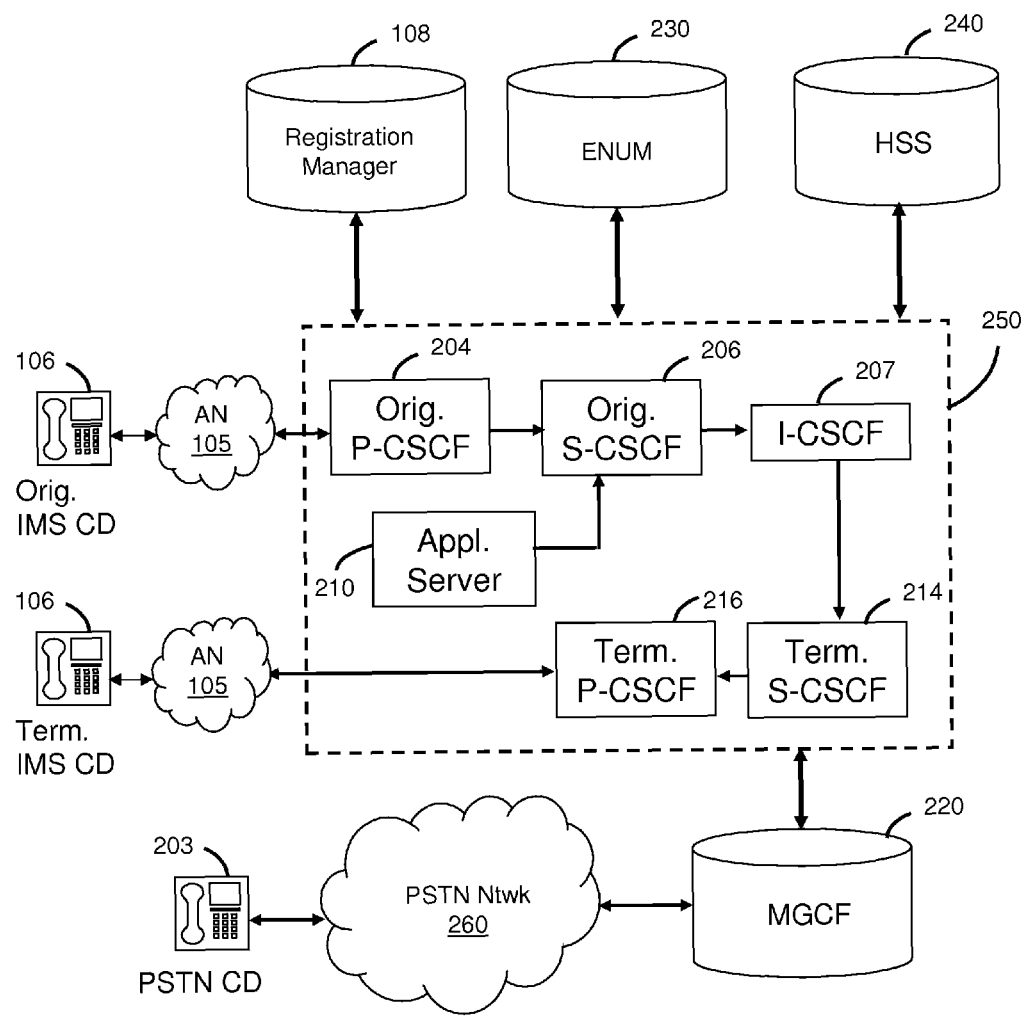
FIG. 2 depicts an exemplary block diagram of an IP Multimedia Subsystem (IMS) network operating in the communication system.

When connected to one of these networks, the MVCD 106 can receive and make VoIP calls by way of an IP Multimedia Subsystem (IMS) communication system 101 such as shown in FIG. 2. A registration manager 108 utilizing common computing and communications technologies can be used to manage registration of MVCDs 106 roaming in the WiFi access network 105.

The IMS communication system 101 can comprise a Home Subscriber Server (HSS) 240, a tElephone NUmber Mapping (ENUM) server 230, and network elements of an IMS network 250. The IMS network 250 can be coupled to IMS compliant communication devices (CD) 106 or a Public Switched Telephone Network (PSTN) CD 203 using a Media Gateway Control Function (MGCF) 220 that connects the call through a common PSTN network 260.

IMS CDs 106 can connect to the IMS network 250 by way of the access network 105 described in FIG. 1 (or a wireline interface not shown). IMS CDs 106 can register with the IMS network 250 by contacting a Proxy Call Session Control Function (P-CSCF) which communicates with a corresponding Serving CSCF (S-CSCF) to register the CDs with an Authentication, Authorization and Accounting (AAA) support by the HSS 240.

To accomplish a communication session between CDs, an originating IMS CD 106 can submit a SIP INVITE message to an originating P-CSCF 204 which communicates with a corresponding originating S-CSCF 206. The originating S-CSCF 206 can submit the SIP INVITE message to an application server (AS) such as reference 210 that can provide a variety of services to IMS subscribers. For example, the application server 115 can be used to perform originating treatment functions on the calling party number received by the originating S-CSCF 206 in the SIP INVITE message. Originating treatment functions can include determining whether the calling party number has international calling services, and/or is requesting special telephony features (e.g., *72 forward calls, *73 cancel call forwarding, *67 for caller ID blocking, and so on).

Additionally, the originating SCSCF 206 can submit queries to the ENUM system 230 to translate an E.164 telephone number to a SIP Uniform Resource Identifier (URI) if the targeted communication device is IMS compliant. If the targeted communication device is a PSTN device, the ENUM system 230 will respond with an unsuccessful address resolution and the S-CSCF 206 will forward the call to the MGCF 220 via a Breakout Gateway Control Function (not shown).

When the ENUM server 230 returns a SIP URI, the SIP URI is used by an Interrogating CSCF (I-CSCF) 207 to submit a query to the HSS 240 to identify a terminating S-CSCF 214 associated with a terminating IMS CD 106. Once identified, the I-CSCF 207 can submit the SIP INVITE to the terminating S-CSCF 214 which can call on an application server similar to reference 210 to perform the originating treatment telephony functions described earlier. The terminating S-CSCF 214 can then identify a terminating P-CSCF 216 associated with the terminating CD 106. The P-CSCF 216 then signals the CD 106 to establish communications.

The aforementioned process is symmetrical. Accordingly, the terms "originating" and "terminating" in FIG. 2 can be interchanged.

The IMS network 250 can also be coupled to the registration manager 108 previously described in FIG. 1.

Figure 3:
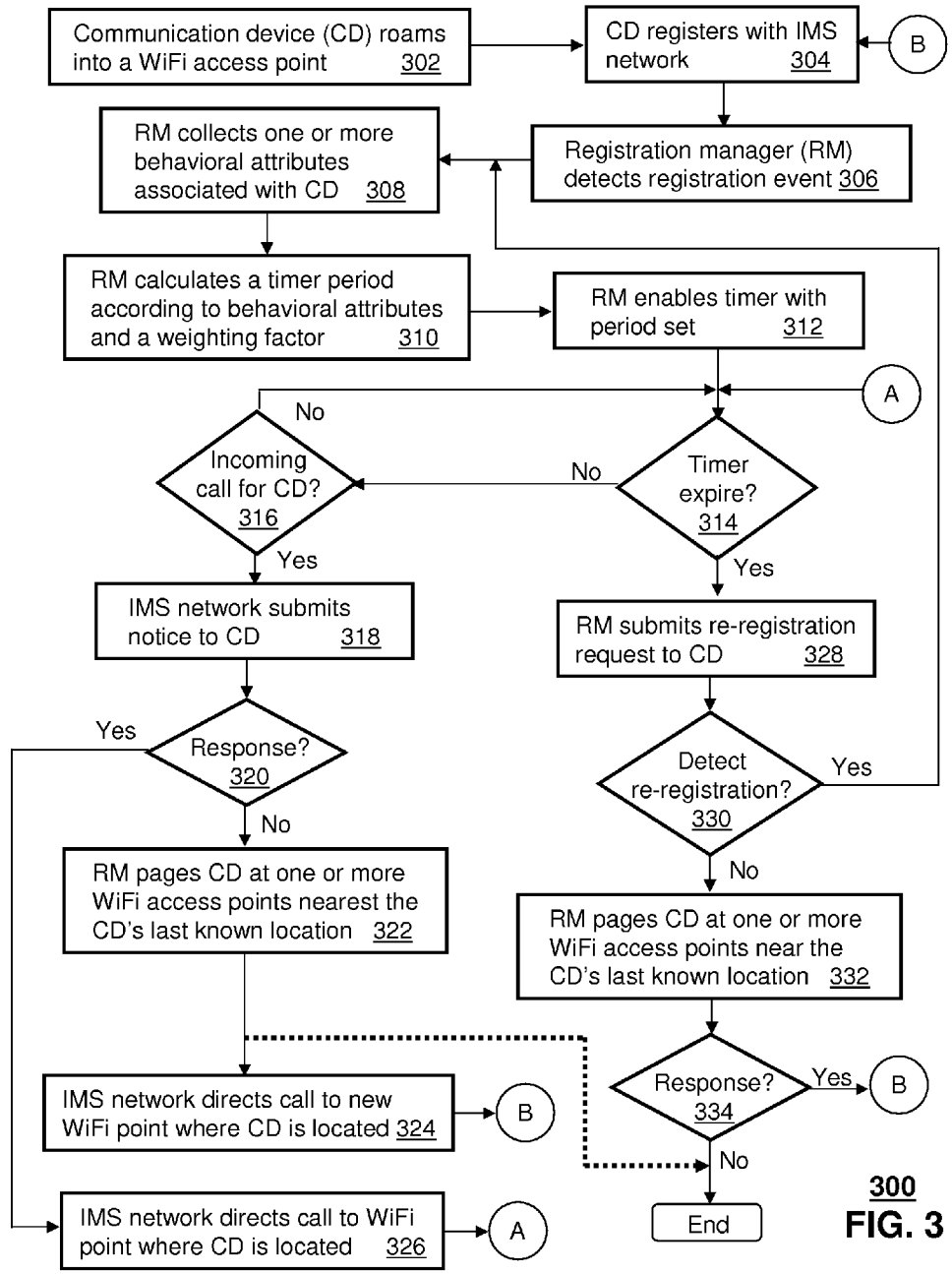
FIG. 3 depicts an exemplary method operating in portions of the communication system.

FIG. 3 depicts an exemplary method 300 operating in portions of the communication system 100. Method 300 begins with step 302 in which an MVCD 106 roams into a coverage cell 104 of a WiFi access point 102. The MVCD 106 registers in step 304 with the call processing elements of the IMS network 250 as described above. In step 306, the registration manager 108 detects the registration event and in step 308 collects one or more behavioral attributes associated with the MVCD 106.

Behavioral attributes can include for example an average time the MVCD 106 is operating in a portion of the cluster of WiFi access points shown as access network 105 (denoted as "$T_o$"), an average number of calls directed to the MVCD by other communication devices (denoted as "F"), and/or an average number of times the MVCD departs from the cluster of WiFi access points (denoted as "D"). With this information and a number of weighting factors, the registration manager 108 can calculate a period of a timer in step 310 which can be used to signal the registration manager to direct the MVCD 106 to re-register with the IMS communication system 101.

Weighting factors can include for example a probability (P) that a departure of the MVCD 106 from the WiFi access point 102 it was last coupled to does not result in a de-registration of the MVCD, a first weighting factor ($w_R$) associated with resources of the call processing elements of the IMS network 250 needed to register the MVCD, a second weighting factor ($w_C$) associated with resources of the call processing system for notifying the MVCD of an incoming call, and/or an attenuation factor (A).

The system resources consumed when the MVCD 106 is in the same WiFi access point 102 continuously can be calculated as:

$$S_R = w_R \cdot \frac{T_0}{T}$$

"T" denotes a period of the timer used by the registration manager 108. Since it's probable that the MVCD 106 will roam between WiFi access points 102 several times a day, the attenuation factor (A) can be used to minimize the chance that the MVCD will roam to another WiFi access point without the knowledge of the calling processing elements of the IMS network 250. With the attenuation factor, the system resource equation can be expressed as:

$$S_R = w_R \cdot \frac{T_0}{T} \cdot \frac{1}{A}$$

The system resources consumed when the MVCD 106 roams away from a WiFi access point 102 without terminating the registration status at said WiFi access point can be expressed as:

$$S_C = w_C \cdot \frac{1}{2} \cdot T \cdot D \cdot F \cdot P$$

A factor of T/2 is used to account for random departures of the MVCD from a WiFi access point without an automatic deregistration. The total system resource consumption is the sum of these equations.

$$S = w_R \cdot \frac{T_0}{T} \cdot \frac{1}{A} + \frac{1}{2} \cdot T \cdot D \cdot F \cdot P$$

The total consumption of resources can be minimized when the above equations ($S_R$ and $S_C$) are equalized.

$$w_R \cdot \frac{T_0}{T} \cdot \frac{1}{A} = \frac{1}{2} \cdot w_C \cdot T \cdot D \cdot F \cdot P$$

From this relationship, the period of the timer (T) can be determined for each MVCD 106 roaming between WiFi access points 102 as follows:

$$T = \sqrt{2 \cdot \frac{w_R}{w_C} \cdot \frac{T_0}{A \cdot D \cdot F \cdot P}}$$

Once the timer period (T) has been determined, the registration manager 108 proceeds to step 312 where it enables a timer according to said period. If the timer expires in step 314, the registration manager proceeds to step 328 where it submits a re-registration request to the MVCD 106. If registration manager 108 detects in step 330 a re-registration of the MVCD 106, it proceeds to step 308 and repeats the steps described above. If a registration is not detected, the registration manager 108 proceeds to step 332 where it pages the MVCD 106 at one or more WiFi access points 102 near the MVCD's last know location. If no response is detected after an exhaustive search, method 300 ends under the assumption that the MVCD 106 has likely roamed into the cellular network 110 or the MVCD has been powered off. If on the other hand the MVCD 106 has been found in step 334 to be in a different WiFi access point 102, method 300 is repeated from step 304 as previously described.

Referring back to step 314, if the timer has not expired and there are no incoming calls detected in step 316, the timer continues to be monitored. If however the timer has not expired but an incoming call has arrived for the MVCD 106, the call processing elements of the IMS network 250 submits an incoming call notice in step 318 according to the IMS call processing steps previously described. If a response is detected in step 320, the call is directed to the WiFi access point 102 where the MVCD 106 is located in step 326, and method 300 is repeated from step 314. If no response is detected which may be indicative that the MVCD 106 roamed out of the access point 102 from which it originally registered in step 304, the registration manager 108 can page in step 322 the MVCD. Once the MVCD 106 is found, the IMS network 250 directs in step 324 the call to the new WiFi access point 102 where the MVCD is located and method 300 is repeated from step 304. If there is no response from the page, method 300 ends as previously described.

From the foregoing descriptions, it would be evident to an artisan with ordinary skill in the art that the aforementioned embodiments can be modified, reduced, or enhanced without departing from the scope and spirit of the claims described below. For example, the registration manager 108 can be decentralized so that portions of method 300 operate in one or more call processing elements of the IMS network 150. Additionally, method 300 can be reordered or reduced without departing from the scope of the claim. These are but a few examples of how the embodiments described herein can be updated without altering the scope of the claims below. Accordingly, the reader is directed to the claims for a fuller understanding of the breadth and scope of the present disclosure.

Figure 4:
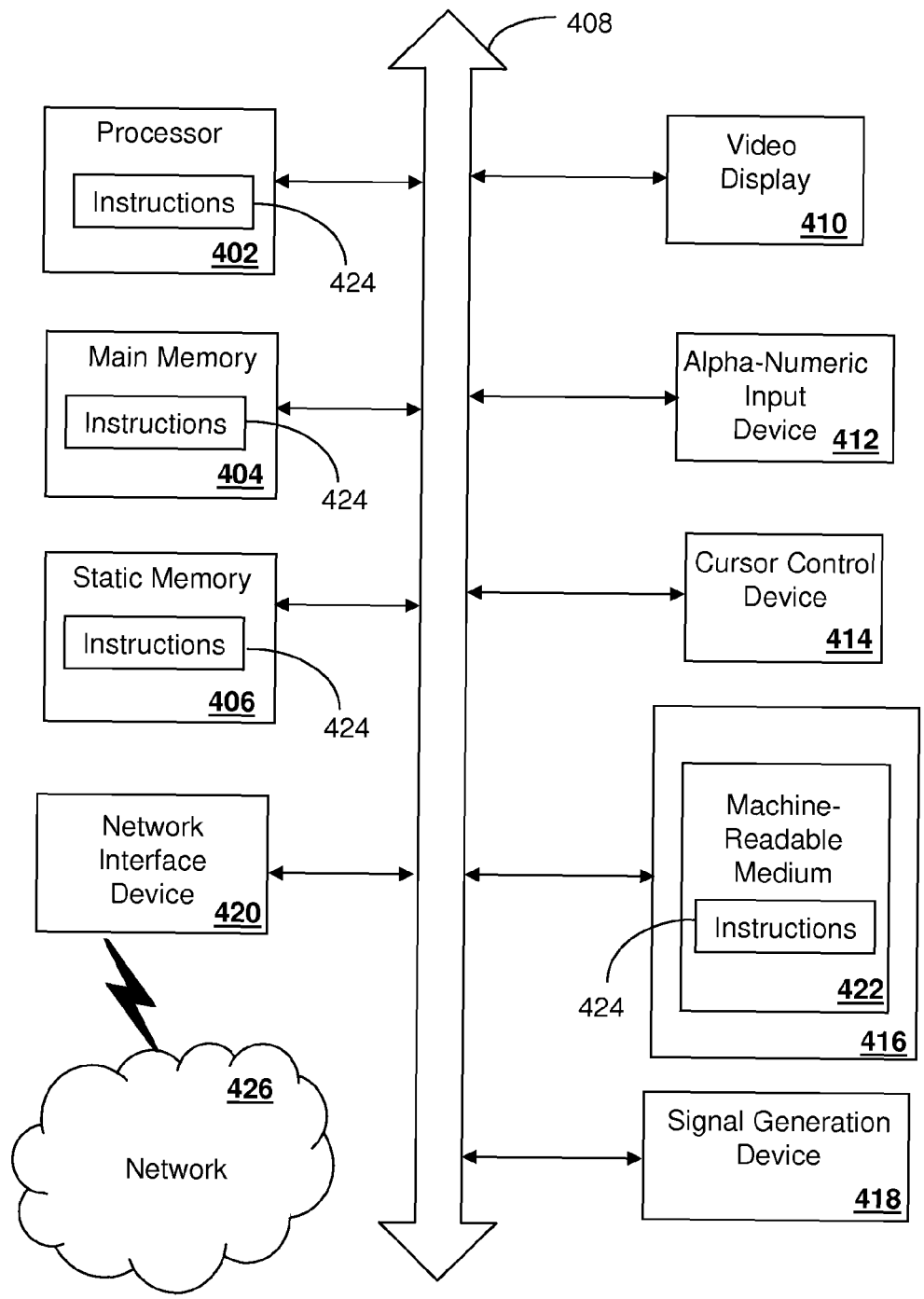
FIG. 4 is a diagrammatic representation of a machine in the form of a computer system within which a set of instructions, when executed, may cause the machine to perform any one or more of the methodologies discussed herein.

FIG. 4 depicts an exemplary diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a mass storage medium 416, a signal generation device 418 (e.g., a speaker or remote control) and a network interface device 420.

The mass storage medium 416 may include a computer-readable storage medium 422 on which is stored one or more sets of instructions (e.g., software 424) embodying any one or more of the methodologies or functions described herein, including those methods illustrated above. The computer-readable storage medium 422 can be an electromechanical medium such as a common disk drive, or a mass storage medium with no moving parts such as Flash or like non-volatile memories. The instructions 424 may also reside, completely or at least partially, within the main memory 404, the static memory 406, and/or within the processor 402 during execution thereof by the computer system 400. The main memory 404 and the processor 402 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the computer-readable storage medium 422 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium, comprising computer instructions for: detecting registration of a mobile Voice over Internet Protocol (VoIP) communication device (MVCD) by way of a Wireless Fidelity (WiFi) access point operating in a cluster of WiFi access points each having cell coverage area;
   enabling a timer having a period determined from one or more behavioral attributes of the MVCD wherein the one or more behavioral attributes comprise at least one among an average time the MVCD is operating in a portion of the cluster of WiFi access points and an average number of calls directed to the MVCD by other communication devices; and
   submitting by way of the WiFi access point a re-registration request to the MVCD responsive to an expiration of the timer.

2. The non-transitory computer-readable storage medium of claim 1, comprising computer instructions for collecting the one or more behavioral attributes of the MVCD.

3. The non-transitory computer-readable storage medium of claim 1, comprising computer instructions for determining the behavioral attributes of the MVCD, wherein the one or more behavioral attributes comprise at least two among an average time the MVCD is operating in a portion of the cluster of WiFi access points, an average number of calls directed to the MVCD by other communication devices, and an average number of times the MVCD departs from the cluster of WiFi access points.

4. The non-transitory computer-readable storage medium of claim 1, comprising computer instructions for applying a weighting factor to the one or more behavioral attributes to determine the period of the timer.

5. The storage medium of claim 4, wherein the weighting factor comprises at least one among a probability that a departure of the MVCD from the WiFi access point does not result in a de-registration of the MVCD from the WiFi access point, a first weighting factor associated with resources of a call processing system to register the MVCD, and a second weighting factor associated with resources of the call processing system for notifying the MVCD of an incoming call.

6. The non-transitory computer-readable storage medium of claim 5, wherein the weighting factor further comprises an attenuation factor.

7. The non-transitory computer-readable storage medium of claim 1, comprising computer instructions for processing a second registration of the MVCD responsive to the re-registration request.

8. The non-transitory computer-readable storage medium of claim 1, comprising computer instructions for:
   detecting that the MVCD is no longer available by way of the WiFi access point; and
   paging the MVCD by way of one or more other WiFi access points of the cluster.

9. The non-transitory computer-readable storage medium of claim 8, comprising computer instructions for selecting the one or more other WiFi access points according to a last known location of the MVCD.

10. The non-transitory computer-readable storage medium of claim 1, wherein the computer-readable storage medium operates in an Internet Protocol Multimedia Subsystem (IMS).

11. A mobile Voice over IP (VoIP) communication device (MVCD), comprising a controller element to:
    register with a VoIP call processing system by way of a Wireless Fidelity (WiFi) access point operating in a cluster of WiFi access points each having cell coverage area; and
    re-register with the VoIP call processing system by way of the WiFi access point in response to receiving a re-registration request upon expiration of a timer having a period determined from one or more behavioral attributes of the MVCD, wherein the one or more behavioral attributes comprise at least one among an average time the MVCD is operating in a portion of the cluster of WiFi access points and an average number of calls directed to the MVCD by other communication devices.

12. The MVCD of claim 11, wherein the re-registration request is generated by the VoIP call processing system.

13. The MVCD of claim 11, wherein the VoIP call processing system collects the one or more behavioral attributes of the MVCD.

14. The MVCD of claim 11, wherein the one or more behavioral attributes comprise at least two among an average time the MVCD is operating in a portion of the cluster of WiFi access points, an average number of calls directed to the MVCD by other communication devices, and an average number of times the MVCD departs from the cluster of WiFi access points.

15. The MVCD of claim 11, wherein the VoIP call processing system applies a weighting factor to the one or more behavioral attributes to determine the period of the timer, and wherein the weighting factor comprises at least one among a probability that a departure of the MVCD from the WiFi access point does not result in a de-registration of the MVCD from the WiFi access point, a first weighting factor associated with resources of a call processing to register the MVCD, a second weighting factor associated with resources of the call processing system for notifying the MVCD of an incoming call, and an attenuation factor.

16. A Wireless Fidelity (WiFi) access point, comprising a controller element to:

receive from a mobile Voice over IP (VoIP) communication device (MVCD) a first wireless message including a registration request directed to a VoIP call processing system;

transmit the registration request to the VoIP call processing system;

receive from the VoIP call processing system a re-registration request directed to the MVCD upon expiration of a timer having a period determined from one or more behavioral attributes of the MVCD, wherein the one or more behavioral attributes comprise at least one among an average time the MVCD is operating in a portion of a cluster of WiFi access points and, an average number of calls directed to the MVCD by other communication devices; and transmit to the MVCD a second wireless message with the re-registration request.

17. The WiFi access point of claim 16, wherein the call processing system collects the one or more behavioral attributes of the MVCD.

18. The WiFi access point of claim 16, wherein the one or more behavioral attributes comprise at least two among an average time the MVCD is operating in a portion of the cluster of WiFi access points, an average number of calls directed to the MVCD by other communication devices, and an average number of times the MVCD departs from the cluster of WiFi access points.

19. The WiFi access point of claim 16, wherein the call processing system applies a weighting factor to the one or more behavioral attributes to determine the period of the timer.

20. The WiFi access point of claim 19, wherein the weighting factor comprises at least one among a probability that a departure of the MVCD from the WiFi access point does not result in a de-registration of the MVCD from the WiFi access point, a first weighting factor associated with resources of a call processing to register the MVCD, a second weighting factor associated with resources of the call processing system for notifying the MVCD of an incoming call, and an attenuation factor.

\* \* \* \* \*